(12) United States Patent
Li et al.

(10) Patent No.: US 7,707,204 B2
(45) Date of Patent: *Apr. 27, 2010

(54) FACTOID-BASED SEARCHING

(75) Inventors: Hang Li, Beijing (CN); Jianfeng Gao, Beijing (CN); Yunbo Cao, Beijing (CN)

(73) Assignee: Microsoft Corporation, Redmond, WA (US)

(*) Notice: Subject to any disclaimer, the term of this patent is extended or adjusted under 35 U.S.C. 154(b) by 228 days.

This patent is subject to a terminal disclaimer.

(21) Appl. No.: 11/302,560

(22) Filed: Dec. 13, 2005

(65) Prior Publication Data

US 2007/0136280 A1 Jun. 14, 2007

(51) Int. Cl.
*G06F 7/00* (2006.01)
*G06F 17/00* (2006.01)

(52) U.S. Cl. ........................... 707/711; 707/673
(58) Field of Classification Search ............... 715/716; 717/106; 705/7, 14

See application file for complete search history.

(56) References Cited

U.S. PATENT DOCUMENTS

| | | | | |
|---|---|---|---|---|
| 5,696,962 A * | 12/1997 | Kupiec | ........................... | 707/4 |
| 6,078,916 A * | 6/2000 | Culliss | ........................... | 707/5 |
| 6,446,061 B1 * | 9/2002 | Doerre et al. | ................... | 707/3 |
| 6,772,149 B1 | 8/2004 | Morelock et al. | ............... | 707/7 |
| 6,948,123 B2 * | 9/2005 | Endou et al. | ................. | 715/700 |
| 7,246,060 B2 | 7/2007 | Geidl et al. | | |
| 7,249,013 B2 * | 7/2007 | Al-Onaizan et al. | ............. | 704/9 |
| 7,269,545 B2 | 9/2007 | Agichtein et al. | ............... | 707/3 |
| 2002/0048269 A1 * | 4/2002 | Hong et al. | .................. | 370/389 |
| 2003/0088410 A1 | 5/2003 | Geidl | | |
| 2003/0229604 A1 | 12/2003 | Zaragoza et al. | ............... | 706/16 |
| 2005/0114324 A1 * | 5/2005 | Mayer | ........................... | 707/3 |
| 2005/0216426 A1 | 9/2005 | Weston et al. | .................. | 706/12 |
| 2006/0212142 A1 | 9/2006 | Madani et al. | ................. | 700/49 |
| 2006/0224569 A1 * | 10/2006 | DeSanto et al. | ................. | 707/3 |
| 2007/0179776 A1 * | 8/2007 | Segond et al. | ................... | 704/9 |
| 2008/0263003 A1 | 10/2008 | Imielinski et al. | .............. | 707/3 |

OTHER PUBLICATIONS

Typed Enterprise Search: Investigation on Time Search, http://msranl:81/Information%20Extraction/Reports/Search%20for%20Time_draft27_pdf, Submission to SIGIR 2005.

Eric Brill, Susan Dumais and Michele Banko, *An Analysis of the AskMSR Question-Answering System*, EMNLP 2002.

Charles L. A. Clarke, Gordon V. Cormack, Thomas R. Lynam, C. M. Li, G. L. McLearn, *Web Reinforced Question Answering (MultiText Experiments for TREC 2001)*. TREC 2001.

Gordon V. Cormack, Charles L. A. Clarke, D. I. E. Kisman, Christopher R. Palmer, *Fast Automatic Passage Ranking (MultiText Experiments for TREC-8)*. TREC 1999.

(Continued)

*Primary Examiner*—Apu M Mofiz
*Assistant Examiner*—Susan Y Chen
(74) *Attorney, Agent, or Firm*—Christopher J. Volkmann; Westman, Champlin & Kelly, P.A.

(57) ABSTRACT

A query and a factoid type selection are received from a user. An index of passages, indexed based on factoids, is accessed and passages that are related to the query, and that have the selected factoid type, are retrieved. The retrieved passages are ranked and provided to the user based on a calculated score, in rank order.

5 Claims, 9 Drawing Sheets

OTHER PUBLICATIONS

Eduard H. Hovy, Laurie Gerber, Ulf Hermjakob, Michael Junk, Chin-Yew Lin, *Question Answering in Webclopedia*. TREC 2000.

Abraham Ittycheriah, Salim Roukos, *IBM's Statistical Question Answering System-TREC 11*. TREC 2002.

Cody C. T. Kwok, Oren Etzioni, Daniel S. Weld, *Scaling question answering to the Web*. WWW-2001: 150-161.

Lucian Vlad Lita, Monica Rogati, Jaime G. Carbonell, *Cross Lingual QA: A Modular Baseline in CLEF 2003*. CLEF 2003: 535-540.

Xiaoyong Liu, W. Bruce Croft, *Passage retrieval based on language models*. CIKM 2002: 375-382.

William Morgan, Warren Greiff, John Henderson, Direct Maximization of Average Precision by Hill-Climbing, with a Comparison to a Maximum Entropy Approach, HLT-NAACL 2004, pp. 93-96.

Thomas S. Morton, *Using Coreference in Question Answering*, TREC1999, 1999.

John M. Prager, Eric W. Brown, Anni Coden, Dragomir R. Radev, 2000. *Question-answering by predictive annotation*. SIGIR 2000: 184-191.

Jay M. Ponte, W. Bruce Croft, *A Language Modeling Approach to Information Retrieval*. SIGIR1998: 275-281.

Dragomir R. Radev, Weiguo Fan, Hong Qi, Harris Wu, Amardeep Grewal, *Probabilistic question answering on the web*. WWW 2002: 408-419.

Stephen E. Robertson, Steve Walker, Micheline Hancock-Beaulieu, Mike Gatford, A. Payne, *Okapi at TREC-4*. TREC 1995.

Gerard Salton, James Allan, Chris Buckley, *Approaches to Passage Retrieval in Full Text Information Systems*. SIGIR 1993: 49-58.

Susan Feldman, *The high cost of not finding information,* KMWorld- vol. 13, Issue 3.

Hui Yang, Hang Cui, Mstislav Maslennikov, Long Qiu, Min-Yen Kan, Tat-Seng Chua, *QUALIFIER In TREC-12 QA Main Task*. TREC 2003: 480-488.

Li Zhang, Yue Pan, Tong Zhang, *Focused named entity recognition using machine learning*. SIGIR 2004: 281-288.

\* cited by examiner

FACTOID-BASED SEARCHING

BACKGROUND

Some current studies have found that workers at many companies spend a significant amount of their time searching for information. A significant number of those workers also report that they find it very difficult to locate information that is required to do their jobs on their internal network systems (such as intranets). Assisting these types of people in accessing information (particularly at an enterprise level) is a challenging issue which many have attempted to address with conventional information retrieval techniques.

However, some conventional information retrieval techniques are not optimally suited to the job. For instance, workers often require not only general search capabilities, but also the capability to search for specific types of information, such as proper names, time schedules, etc.

One current approach to information retrieval is referred to as question answering. the methods used in implementing some current question answering systems are not normally developed to answer questions (or provide information) on a specific type of factoid, and thus, they are not tuned for the type. As a result, question answering systems do not perform well when searching for those types of factoids. Further, question answering systems are often relatively slow, because it is difficult to generate an index for them.

Another type of current information retrieval is known as document retrieval, which is conducted on the basis of a relevance measure that indicates the relevance of a set of documents to queries. Passages are sometimes retrieved, instead of entire documents, for ease of information access. The documents or passages often do not necessarily contain a specific type of information that was requested by the input query.

The discussion above is merely provided for general background information and is not intended to be used as an aid in determining the scope of the claimed subject matter.

SUMMARY

A query and a factoid type selection are received from a user. An index of passages, indexed based on factoids, is accessed and passages that are related to the query, and that have the selected factoid type, are retrieved. The retrieved passages are ranked and provided to the user based on a calculated score, in rank order.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present invention deals with searching information based on a selected factoid type. However, before describing the present invention in more detail, one illustrative environment in which the present invention can be used will be discussed.

Figure 1:
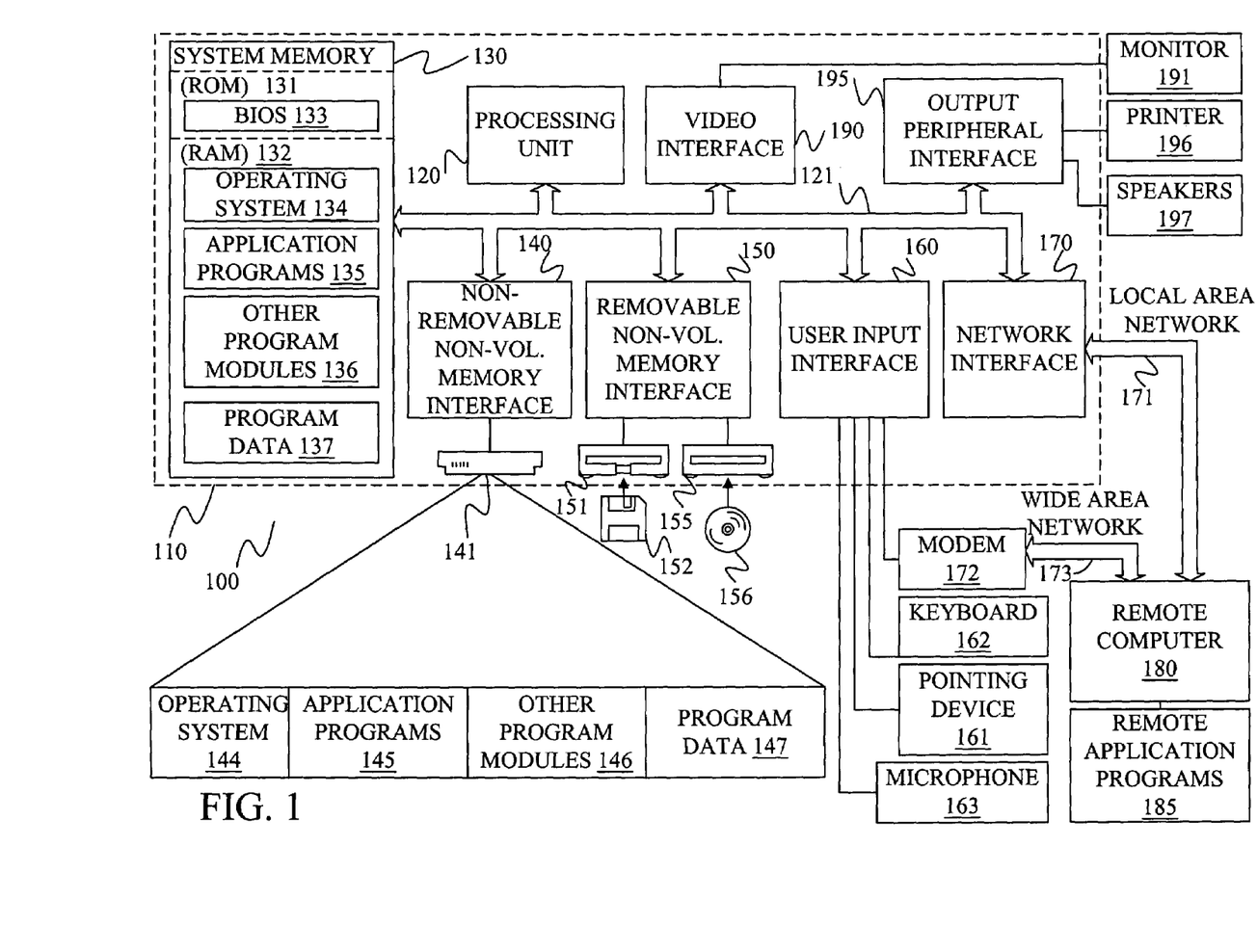
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
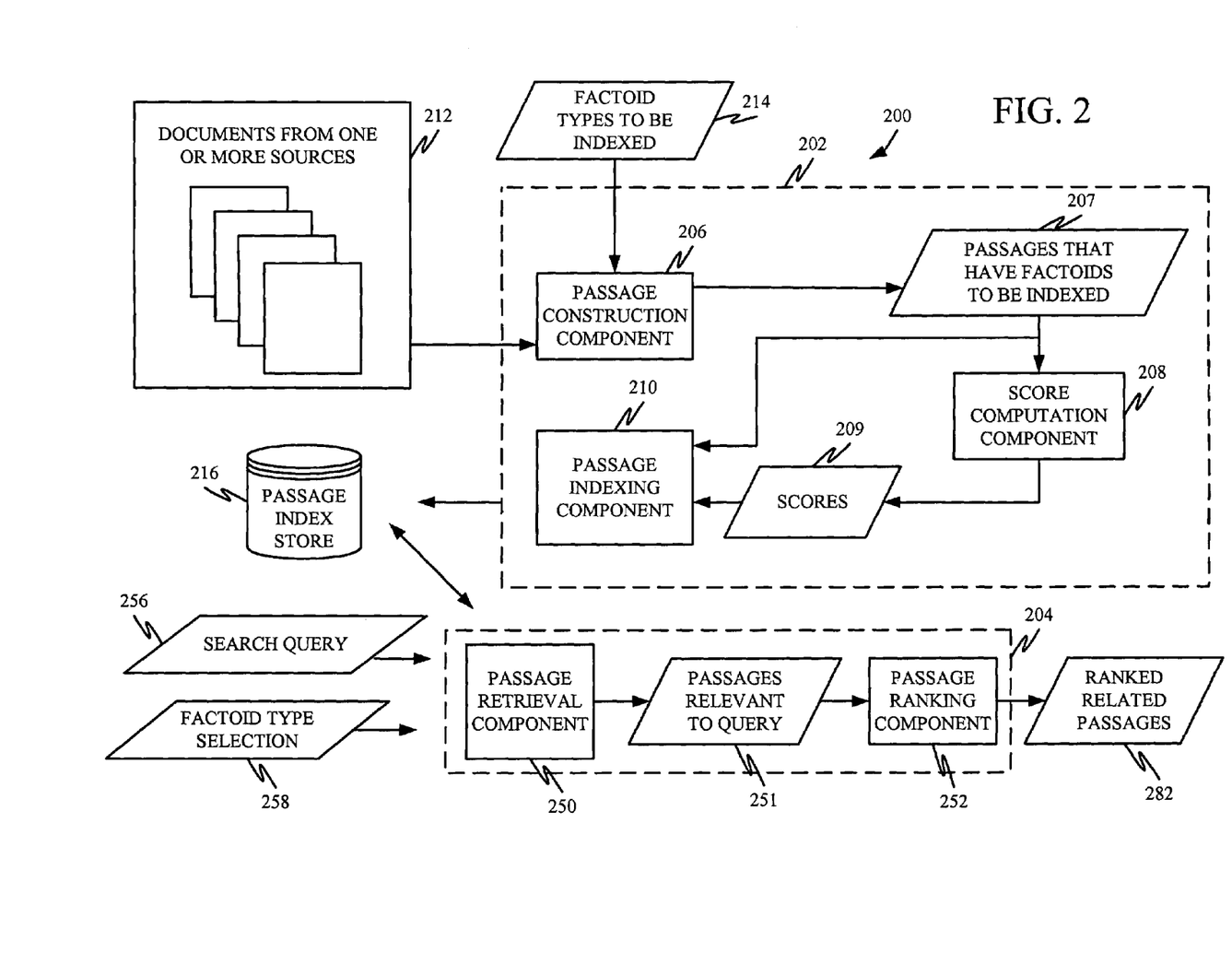
FIG. 2 is a more detailed block diagram of a factoid-based search system in accordance with one embodiment.

FIG. 2 is a more detailed block diagram of a factoid-based search system 200. FIG. 2 is but one illustrative embodiment of such a system, and others could be used. The embodiment shown in FIG. 2 shows that system 200 includes an indexing system 202 and a runtime system 204. Indexing system 202 includes passage construction component 206, score computation component 208, and passage indexing component 210. FIG. 2 shows that indexing system 202 has access to a set of documents 212 and constructs passages from those documents that are related to a predetermined set of factoid types 214. Those passages are scored and indexed in index 216.

By factoid type, the present discussion means individual types or categories of information, sometimes referred to as named entities, and including for example, place names, organization names, telephone numbers, times, dates, events, product names, city names, other proper names, etc. Operation of indexing system 202 is described in more detail below with respect to FIG. 3.

Once the passages and scores are indexed by factoid type, they can be used to perform runtime searches with runtime system 204. Runtime system 204 includes passage retrieval component 250 and passage ranking component 252. Component 250 receives a query 256 and factoid type selection input 258 and retrieves related passages 251 from index 216. Component 252 scores and ranks passages 251 to provide ranked passages 282. This is described in greater detail below with respect to FIG. 5.

Figure 3:
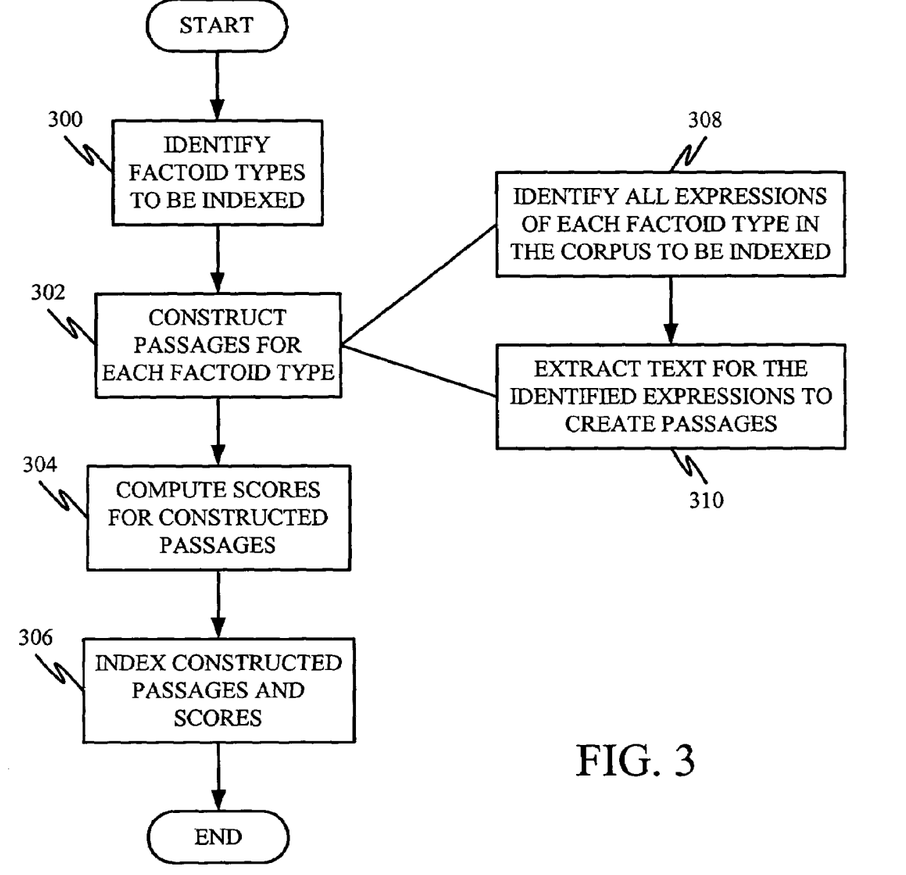
FIG. 3 is a flow diagram illustrating one illustrative embodiment for indexing information.

FIG. 3 is a flow diagram better illustrating one embodiment of operation of indexing system 202. Before indexing passages in documents 212, the particular factoid types 214 to be indexed must be provided. The factoid type 214 to be indexed can be identified by a developer, by an automatic identification system, by using default types or by any other means. Identifying the factoid types to be indexed is indicated by block 300 in FIG. 3.

Passage construction component 206 accesses documents 212 and constructs passages 207 from those documents 212 for each of the factoid types 214 to be indexed. Constructing the passages is indicated by block 302 in FIG. 3. Passages 207 illustratively have factoids of one or more of the identified factoid types 214 within them. For instance, if "time" is a factoid type to be indexed, then passages 207 will be textual passages extracted from documents 212 that have a time factoid or factoid expression (e.g., 12:00, 12 noon, midnight, 8:00 AM, etc.) within them. One way of constructing passages 207 is described in more detail below with respect to FIG. 4. Passages 207 are then provided to score computation component 208.

Score computation component 208 computes a score 209 for each of the passages 207, based on how closely the passage is related to the various factoid types being indexed. Computing the score is indicated by block 304 in FIG. 3. In order to compute a score 209, for each content word w in a passage p (containing a factoid expression under analysis), a ranking function $\phi(w,p)$ is defined. The ranking function represents the likelihood that the factoid expression of the passage p is the correct answer of an event described by the content word w. For instance, if the factoid type is time, then the ranking function represents the likelihood that the time expression in the passage p is the correct answer of the event described by the content word w. The score is pre-calculated and stored for all content word/passage (w,p) pairs. The ranking function $\phi(w,p)$ is described in greater detail below.

Passage indexing and component 210 then indexes both the constructed passages 207 and the corresponding scores 209 which have been computed for each of those passages 207. Passage indexing component 210 places the passages and their scores 209 in passage index store 216. This is indicated by block 306 in FIG. 3.

The indexed passages in store 216 are then used by system 204 to retrieve relevant passages based on an input query. However, before discussing the retrieval process in more detail, one embodiment of the system for constructing passages 207 from documents 212 will be described. This is shown at blocks 308 and 310 in FIG. 3.

Passage construction component 206 first progressively selects each factoid type 214 for indexing. Component 206 then identifies all expressions of each factoid type in the corpus of documents 212 to be indexed. This is indicated by block 308 in FIG. 3. In doing this, component 206 simply parses each of the documents and identifies, within the various portions of the documents, factoids that belong to each of the factoid types 214 to be indexed. For instance, if one factoid type 214 is "time", an expression containing a time factoid might be "12:00 noon". If another factoid type 214 is "company name", an expression containing a company name factoid might be "Microsoft Corporation", and so on. Once those factoid expressions for each of the factoid types 214 are identified, component 206 extracts text for the identified expressions to create passages 207. There are a variety of different ways in which the text related to the expressions can be extracted in order to construct passages 207, and one of those is described below in greater detail with respect to FIG. 4. Extraction of text for the identified expressions, to create passages 207 is indicated by block 310 in FIG. 3.

Figure 8:
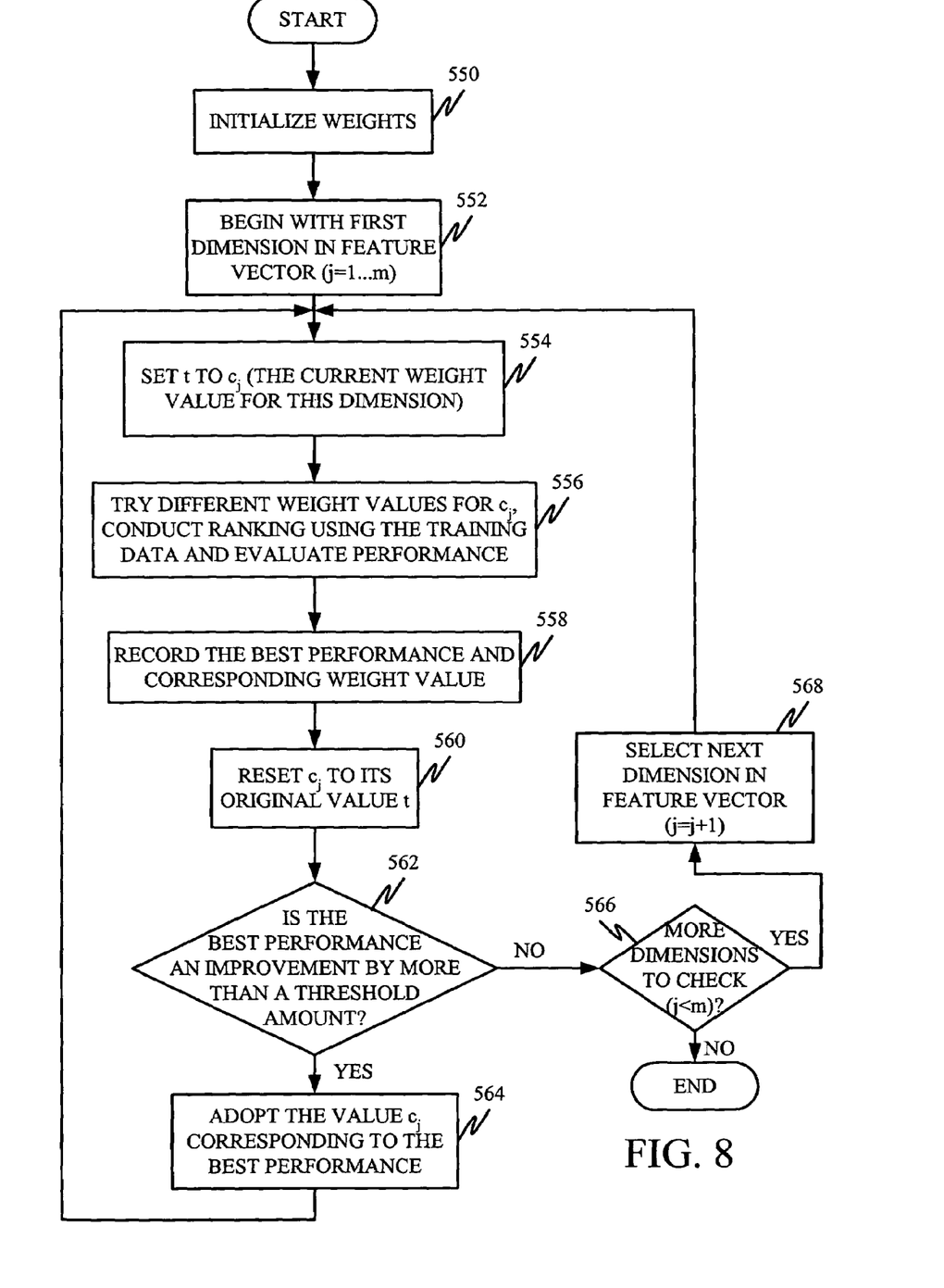
FIG. 8 is a flow diagram illustrating one illustrative embodiment for training weights in a ranking model.

The ranking function $\phi(w,p)$ is now described in more detail. In one embodiment, for each content word w in the passage p, a vector of features is created, with m dimensions, and is denoted as $(x_{w,p,1}, \ldots, x_{w,p,m})$, and a linear combination model is employed to compute $\phi(w,p)$ as follows:

$$\varphi(w, p) = \sum_{j=1}^{m} c_j x_{w,p,j} \qquad \text{Eq. 2}$$

where $c_j$ for $j=1, \ldots, m$ are weights of different features in the feature vector. The weights $c_j$ are trained as described below with respect to FIG. 8. The features in vector $(x_{w,p,1}, \ldots, x_{w,p,m})$ will vary with the particular factoid type being processed. However, by way of example, a set of features will now be described for an embodiment in which the factoid type being processed is time. Given a passage p and a content word w in p, a feature vector $(x_{w,p,1}, \ldots, x_{w,p,m})$ is defined of, for example, 35 dimensions from a set of four different aspects. The content word in these aspects is identified as "Word". The designation "time" refers to the factoid expression that contains the factoid.

TABLE 1

1. Features of Word (1) Inverse document frequency (IDF) value of Word;
(2) Term frequency (TF) value of Word in original document;
(3) TF * IDF value of Word;
(4) Distribution of Word in original document, measured in terms of entropy.
(5) Part of speech of Word.

2. Features of passage (1) Type of Time in passage (e.g., "Aug. 1, 2000", "Aug., 2000", or "2000");
(2) Bag of words in passage (i.e., the actual words in the passage);
(3) Size of passage.

3. Features on location (1) Minimum distance between Time and Word, in terms of the number of words, sentences, and paragraphs, respectively separating them;
(2) Does Word occur in same sentence or paragraph as Time?
(3) Does Word occur in the same partial sentence (segmented by ",") as Time?
(4) Does Word occur one line below or above current line only containing Time?
(5) Does Word occur in metadata title?
(6) Does Word occur in previous or next sentence of Time?
(7) Does Word occur immediately before or after Time?

4. Features on the relation of this expression with other time expressions (1) Is there any other time expression in the same sentence as Time?

TABLE 1-continued (2) Is there any other time expression closer to the Word (in terms of word, sentence, and paragraph distance)?

Figure 4A:
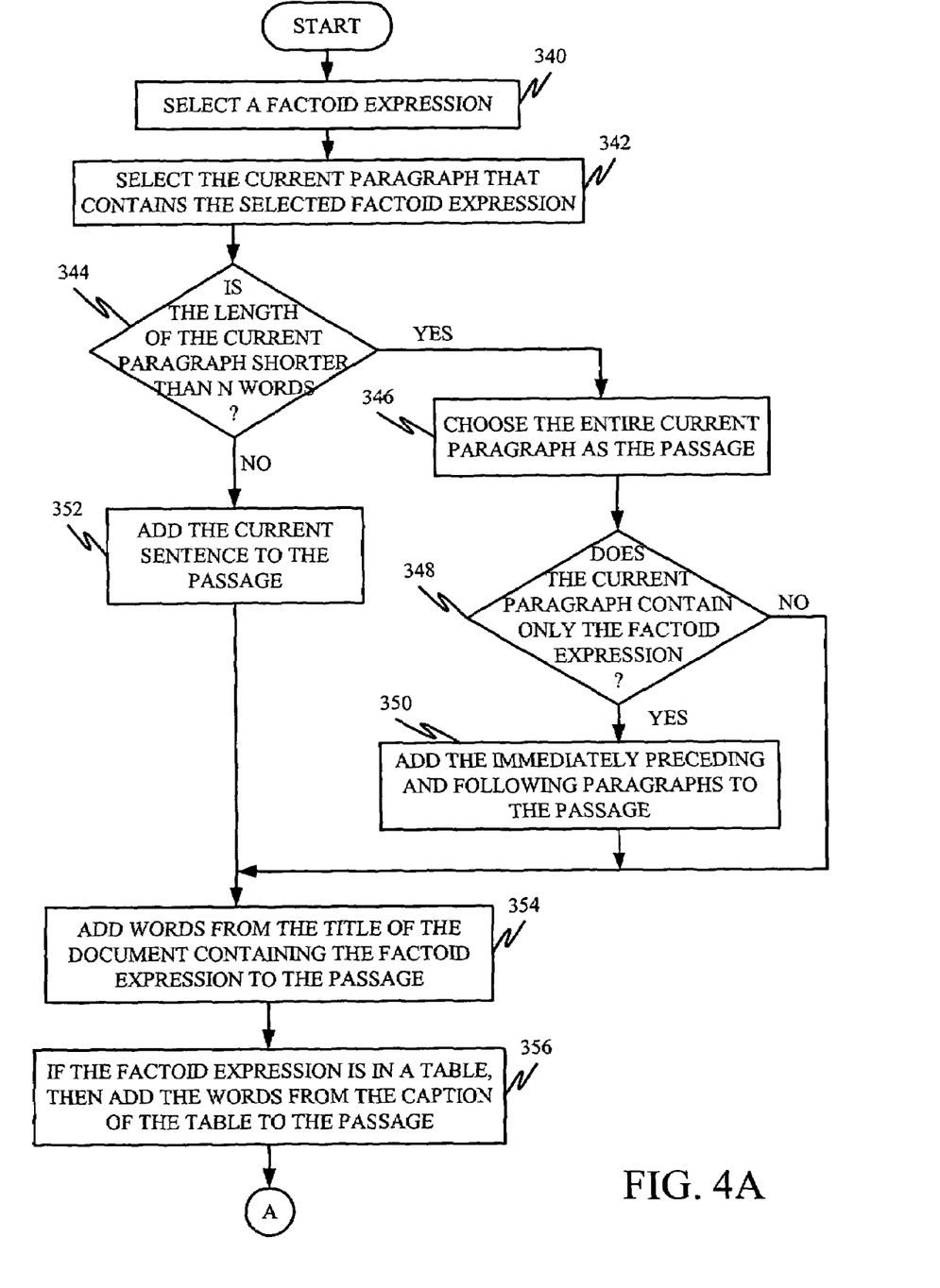
FIGS. 4A and 4B (collectively FIG. 4) form a flow diagram illustrating one illustrative embodiment for construction of passages.
Figure 4B:
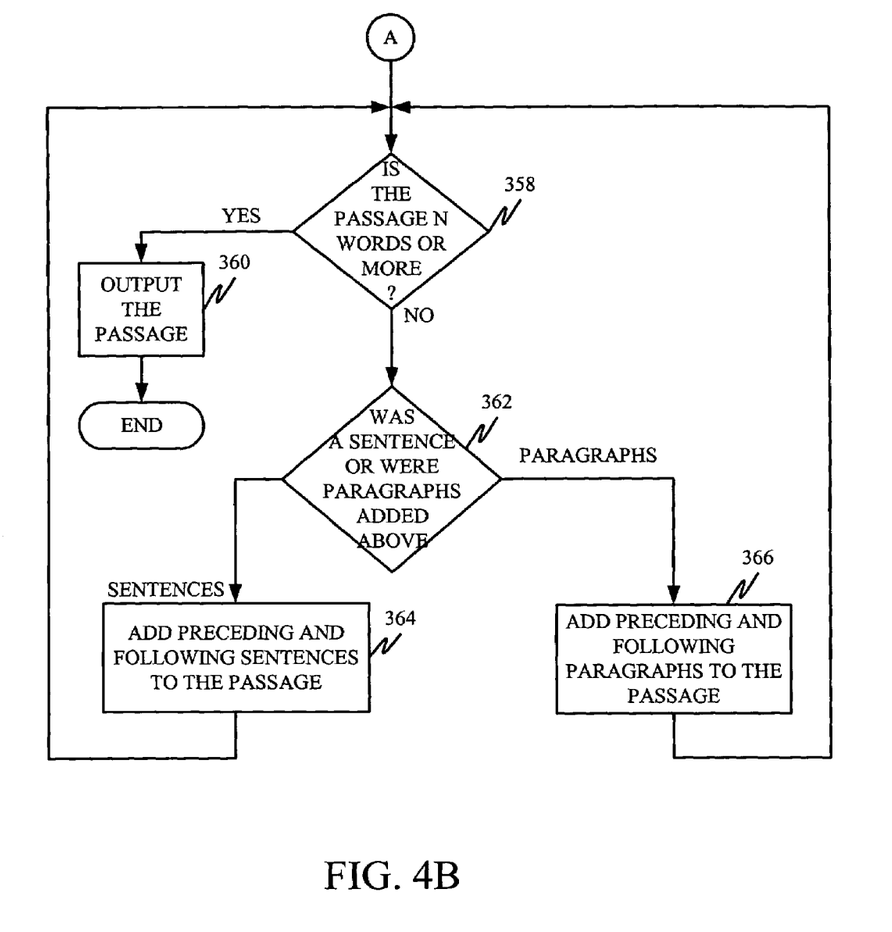

FIG. 4 shows an embodiment for constructing passages 207 in more detail. FIG. 4 illustrates the operation of a rules-based method that utilizes not only text boundary information, but also table caption and metadata title information in passage construction. The method shown in FIG. 4 continues to add text to the passage 207 for a factoid expression until the passage length reaches a predetermined word limit.

It is assumed for the sake of FIG. 4 that the factoid expressions of the identified factoid types 214 in documents 212 have already been identified. Component 206 then selects one of those factoid expressions as the basis of a passage 207 containing that expression. Selecting a factoid expression is indicated by block 340 in FIG. 4.

Component 206 then selects the current paragraph, which is the paragraph in document 212 that contains the selected factoid expression. This is indicated by block 342. Component 206 determines whether the length of the current passage is shorter than a threshold number, N, words. This is indicated by block 344. If the current paragraph has fewer words than the threshold number N, then component 206 chooses the entire current paragraph as the passage 207 for that factoid expression. This is indicated by block 346 in FIG. 4.

Component 206 then determines whether the current paragraph contains only the factoid expression. In other words, if the factoid expression is a time of day (say 8:00 pm), and that time of day resides as its own paragraph, then component 206 adds the immediately preceding and following paragraphs to the passage 207 for that expression. Determining whether the paragraph contains only the factoid expression, and, if so, adding the preceding and following paragraphs to the passages are indicated by blocks 348 and 350 in FIG. 4.

If, at block 348, it is determined that the current paragraph does not contain only the factoid expression, then processing continues at block 354. This is discussed below.

If, at block 344, it is determined that the length of the current paragraph is not shorter than the threshold number N words, then component 206 adds the current sentence (the sentence that contains the factoid expression) to the passage 207. This is indicated by block 352 in FIG. 4.

Once the determination has been made to add the sentence containing, or paragraphs surrounding, the factoid expression, processing continues at block 354 which is optional. In the embodiment in which block 354 is used, component 206 adds words from the title of the document containing the factoid expression to the passage 207 corresponding to the factoid expression. In one embodiment, the documents 212 can be HTML documents in which the title is identified in metadata. In that case, the words from the metadata identifying the title in the HTML document 212 can be added. In other embodiments, the text from the title can be added to the passage 207.

Block 356 is also optional. In the embodiment in which block 356 is used, component 206 determines whether the factoid expression is in a table. If so, then component 206 adds the words from the caption of the table to the passage 207.

Once these items have been added to passage 207, component 206 determines whether the passage has reached the threshold N words or more. This is indicated by block 358 in FIG. 4. If so, the passage is simply output as indicated by block 360.

If, at block 358, it is determined by component 206 that the passage has not reached the threshold number N words, then component 206 determines whether, in the processing at block 344, a sentence was added, or paragraphs where added, to the passage. This indicated by block 362. If a sentence was added (as at block 352) then the preceding and following sentences are added to the passage 207. This is indicated by block 364. Processing again reverts back to block 358 to determine whether the passage 207 contains at least N words. If not, processing again follows through blocks 362 and 364 in which more preceding and following sentences (preceding and following the current passage) are added to the passage. This continues until enough preceding and following sentences are added to the passage such that the passage includes at least N words.

If, at block 362, it is determined that in the above processing in FIG. 4 paragraphs were added to the passage, then component 206 adds the preceding and following paragraphs to the passage as indicated by block 366. Processing then reverts back to block 358 where it is determined whether the passage being constructed now has at least N words. If not, processing continues to follow through blocks 362 and 366 in which case additional preceding and following paragraphs are added to the passage until the passage contains at least the predetermined number N words. In either case (whether sentences or paragraphs are added), processing continues until the passage contains at least N words. At that point, the passage is output as indicated by block 360 and the processing terminates with respect to the current passage 207.

Figure 5:
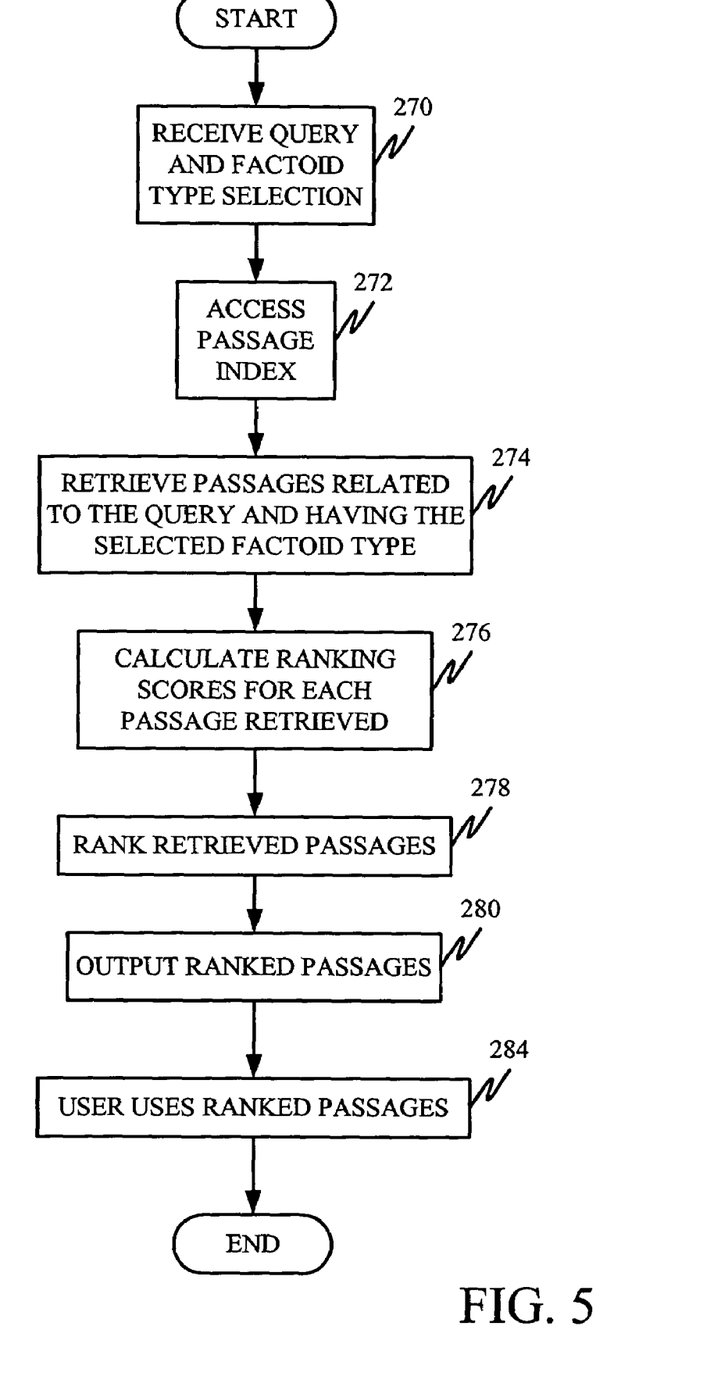
FIG. 5 is a flow diagram illustrating one illustrative embodiment of a runtime search.
Figure 6:
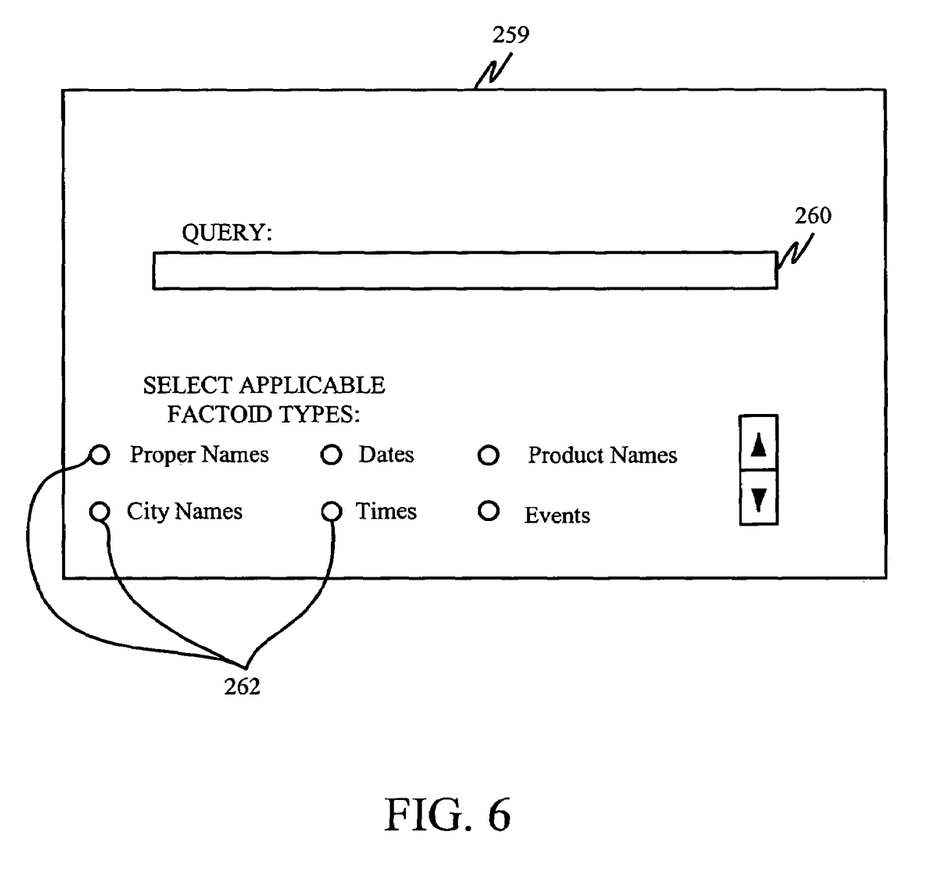
FIG. 6 illustrative embodiment of a user interface.

FIG. 5 is a flow diagram better illustrating the operation of retrieval system 204. Retrieval system 204 includes passage retrieval component 250 and passage ranking component 252. Passage retrieval component 250 first receives a user search query 256 and a factoid type selection 258 from the user. FIG. 6 is one illustrative user interface which allows a user to input both the query 256 and the factoid type selection 258. FIG. 6 shows that a user interface 259 includes a text box 260 in which a user can type a query. Exemplary queries might take many different forms, such as: "what is", "how to", "who knows about", "when", or "why". The user interface 259 shown in FIG. 6 also includes a plurality of type selection input mechanisms generally illustrated at 262. The type selection mechanisms are illustratively check boxes which can be selected by the user for input to component 250. In one embodiment, there are approximately 20-30 different factoid types which can be selected. Of course, any other desired number can be used as well. Receiving the query and factoid type selection is indicated by block 270 in FIG. 5.

After receiving the query 256 and factoid type selection 258, passage retrieval component 250 accesses passage index store 216 to obtain access to all passages of the selected factoid type 258. Recall that the passages are indexed by factoid type so they can be easily accessed given the factoid type selection 258. This is indicated by block 272 in FIG. 5.

Passage retrieval component 250 then retrieves passages 251 from index 216 that are related to the search query 256 and have the selected factoid type 258. This is indicated by block 274 in FIG. 5. Next, a score is calculated for each of the passages retrieved. This is indicated by block 276. Based on the calculated score, the retrieved passages are ranked, as indicated by block 278.

In scoring and ranking the retrieved passages 251, a number of different scoring systems can be used. In one illustrative embodiment, given a search query q, and each passage 251 retrieved with q, a ranking function s(q,p) is defined as follows:

$$s(q, p) = \sum_{w \in q \cap p} \varphi(w, p) \qquad \text{Eq. 1}$$

where w stands for a keyword (content word) appearing in both the query q and the passage p. The function in Eq. 1 represents the likelihood that the factoid expression of the passage p is the correct answer of an event described by the query q. For instance, where the factoid expression is a time expression, the function represents the likelihood that the time expression of the passage p is the correct answer of an event described by the query q.

In order to rank the passages, the score from Eq. 1 is calculated for each passage 251, while looking up from the index 216 the pre-computed scores of all related $\phi(w,p)$ pairs. These are the scores which were pre-calculated offline as described above. Then, the passages are sorted in descending order of the score computed in Eq. 1. Outputting the ranked passages 282 is indicated by block 280.

The ranked passages can then be used by a user, as desired. This is indicated by block 284 in FIG. 5. In one embodiment, the user can simply use the passages to answer questions. In another embodiment, the user can select the desired passages to retrieve the documents from which they came, etc.

Figure 7:
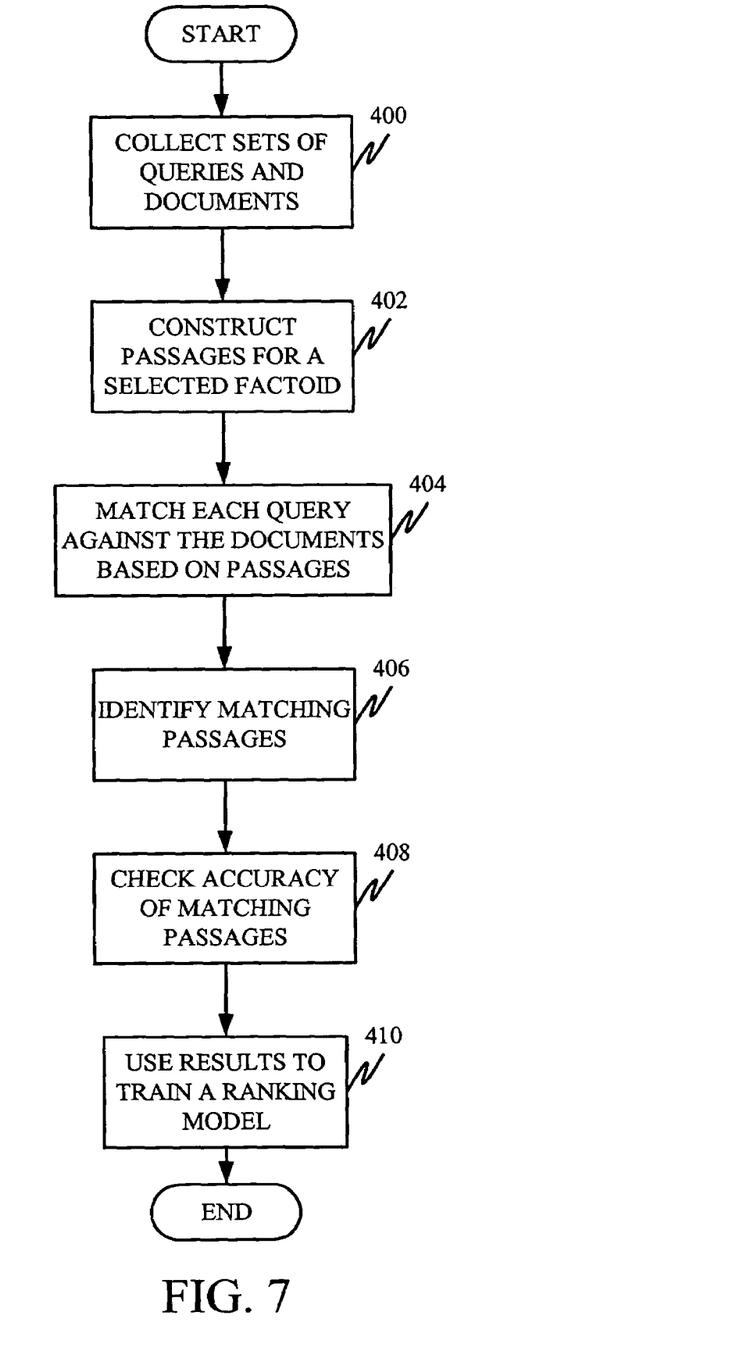
FIG. 7 is a flow diagram illustrating one illustrative embodiment for generating a ranking model.

FIG. 7 is a flow diagram better illustrating one embodiment for training passage ranking component 252. First, a set of training data which includes queries and documents is collected. This is indicated by block 400 in FIG. 7. Passages for a selected factoid type are then constructed as described with respect to FIG. 4 above. This is indicated by block 402. Each query is then matched against the documents based on the constructed passages. This is indicated by block 404. Based on the matching in block 404, matching passages are identified and are checked for accuracy. This is indicated by blocks 406 and 408 in FIG. 7. In one embodiment, the accuracy is checked manually. The expressions in each of the passages are determined to be either positive instances in which they are viewed to be correct answers to the query, or negative instances in which they are viewed to be incorrect answers.

Then, the instances are used to construct a model for ranking the passages. The model utilizes information on the position relation between the factoid expression and keywords in the query, the characteristics of the keyword, the characteristics of the passages, etc. This is indicated by block 410.

FIG. 8 is a flow diagram illustrating one embodiment for training the ranking model in component 252 in greater detail. In the embodiment described with respect to FIG. 8, labeled training data is used. For instance, for each query q, assume that there are l associated passages and l assigned labels. Then, the labeled data with respect to q denoted as follows:

$$(p_1, y_1), \ldots, (p_i, y_i), \ldots, (p_l, y_l) \qquad \text{Eq. 3}$$

where $p_i$ denotes a passage and $y_i$ denotes a label having the value 1 or 0 (denoting a positive or negative instance). For each keyword (content word) $w_k$ appearing in both the query q and the passage $p_i$, the corresponding feature vector $(x_{w,p,1}, \ldots, x_{w,p,m})$ is created. Next, the value $\phi(w_k p_i)$ (as set out in Eq. 2) is calculated, as is the score $s(q,p_i)$ as set out in Eq. 1.

The passages $p_1, \ldots, p_l$ are then ranked for each query q based on their scores calculated as described in Eq. 1. Since there are answers (labels) $y_1, \ldots, y_l$ for each query q, the total ranking results can be evaluated. Training the model (or machine learning) is a process of finding the optimal weight vector $(c_1, \ldots, c_m)$ for achieving the optimal ranking results in terms of an evaluation measure.

FIG. 8 is a flow diagram better illustrating one embodiment for learning this desired weight vector $c_1, \ldots, c_m$. First, the weights are initialized. In one embodiment, they are initialized to a value of 0. This is indicated by block 550 in FIG. 8. Next, processing cycles through each dimension (j=1–m) of the feature vector, beginning with the first dimension in the feature vector. This is indicated by block 552 in FIG. 8. Next, a variable t is set to the current weight value $c_j$. This is indicated by block 554 in FIG. 8.

A plurality of different weight values are then tried for $c_j$, and ranking is performed using the training data. The performance of the ranking is then evaluated as indicated by block 556. In one illustrative embodiment, the performance of the ranking is evaluated in terms of Mean Average Precision (MAP). Mean Average Precision is defined as a Mean of the Average Precision over queries and the Average Precision for each query is defined as follows:

$$\text{average\_precision} = \sum_{j=1}^{M} p(j) * \Delta r(j) \qquad \text{Eq. 4}$$

Where p(j) denotes precision over the top j results, and $\Delta r(j)$ is a change in recall from j–1 to j.

The best performance and corresponding weight value $c_j$ is recorded as indicated by block 558 and $c_j$ is reset to its original value t. This is indicated by block 560.

If the best performance in terms of Mean Average Precision for the value $c_j$ is an improvement by more than a threshold amount over the previous value of $c_j$, then the new value for $c_j$ is adopted (that value which corresponds to the best performance just computed). This is indicated by blocks 562 and 564 in FIG. 8. Processing then reverts to block 554 where the process iterates until the change in the weight value $c_j$ no longer exceeds the predetermined threshold amount at block 562. In that case, the best value for that desired weight $c_j$ has been computed.

Processing then progresses to block 566 where it is determined whether there are more dimensions to check (i.e., whether j<m). If not, the weight values for all of the dimensions of the feature vector have been computed and the process concludes. However, if there are more values of $c_j$ to be computed, then the weight value for the next dimension in the feature vector (i.e., j=j+1 for $c_j$) is selected as illustrated at block 568 and the process continues at block 554.

In accordance with one embodiment, the particular measure used in passage ranking is a distance measure. For instance, if the key words in the query match the passage, and the matched keywords in the passage are close to the factoid expression in the passage, then it is likely that the factoid expression is the answer to the query. One such method employs the following distance function as an exemplary ranking function:

$$s(q, p) = \sum_{w \in q \cap p} \varphi(w, p) = \sum_{w \in q \cap p} \exp(-a * d(t, w)) \qquad \text{Eq. 5}$$

where w denotes a keyword, t denotes time, d is the minimum distance between t and w, and a is a parameter that can be empirically set.

In accordance with yet another embodiment, retrieved passages 251 are ranked by using a voting algorithm. In other words, each passage 251 has a score and each passage 251 may support more than one factoid expression. In one embodiment, voting logic is used to weight the scores to determine which time expression is most strongly supported by the passage 251. For instance, assume a first retrieved passage 251 supports a first expression with a weight of 0.5 and a second passage 251 supports the first expression with a weight of 0.2, but a third passage 251 also supports a second expression with a weight of 0.6. Then, the first expression will be weighted higher than the second expression, because it has a total weight of 0.7, while the second expression has a total weight of 0.6. This is true even though the score for the second expression is higher than the highest score for the first expression. The sum of scores for the second expression is still lower than the sum of all the scores for the first expression. In accordance with another embodiment, voting is simply conducted using the numbers of occurrences of the factoid expression in the passage.

In either voting method, the particular factoid expressions whose ratios of keywords matched to passages is less than a predetermined value $\beta$, or which are not ranked in the top k passages, are discarded. In one embodiment, $\beta$ is approximately 0.6 while k is approximately 13. However, any of a wide variety of other values of $\beta$ and k can be used and the values can be empirically determined. It has been observed that using one or both of these voting techniques after ranking can further enhance the performance of passage ranking. Similarly, the use of one or more of these voting algorithms can improve both the rule-based passage construction method and the passage ranking methods described above with respect to FIGS. 4 and 5, respectively.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of indexing stored information in a query answer system, comprising:
   receiving, at a processor of the computer, a user input specifying a factoid type; identifying expressions in the stored information on the computer storage device containing a factoid of the user-specified factoid type;
   constructing, with the processor, a passage corresponding to each expression identified by extracting text from the stored information containing the expression, wherein extracting text includes:
      determining whether a paragraph containing a given expression has at least a threshold number of words;
      if the paragraph containing the given expression does not have at least the threshold number of words, extracting the paragraph containing the expression and adding it to the passage;
      if the paragraph containing the given expression contains only the given expression, then extracting a paragraph preceding the given expression and a paragraph subsequent to the given expression and adding the preceding and subsequent paragraphs to the passage; and
      repeatedly extracting paragraphs or sentences and adding them to the passage until the passage contains at least the threshold number of words;
   computing, with the processor, a score corresponding to each passage based on a relationship between the passage and the user-specified factoid type, wherein computing a score corresponding to each passage comprises determining a likelihood that a factoid in an expression corresponding to a given passage answers a request represented by at least one content word, wherein determining a likelihood comprises computing a ranking function for each content word in the given passage; and
   generating, with the processor, an index of the passages and corresponding scores based on the user-specified factoid type contained in the expression, and storing the index on a computer storage device.

2. The method of claim 1 and further comprising:
   repeating the steps of identifying, constructing, computing and generating for each of a plurality of user-specified factoid types.

3. The method of claim 1 wherein extracting text further comprises:
   extracting title information indicative of a title of a document containing the given expression and adding the title information to the passage.

4. The method of claim 1 wherein extracting text further comprises:
   if the given expression is contained in a table, extracting caption information indicative of a caption of the table and adding the caption information to the passage.

5. The method of claim 1 wherein computing a ranking function comprises:
   linearly combining weighted features in a multi-dimensional feature vector for each content word.

* * * * *